United States Patent [19]

Harmant

[11] 4,326,440

[45] Apr. 27, 1982

[54] METAL CUTTING MACHINES

[75] Inventor: Michel Harmant, Neris-les-Bains, France

[73] Assignee: Ems Industrie, Montlucon, France

[21] Appl. No.: 96,144

[22] Filed: Nov. 20, 1979

[30] Foreign Application Priority Data

Nov. 22, 1978 [FR] France ............................... 78 32928

[51] Int. Cl.³ ......................... B26D 1/00; B26D 7/00; B29H 17/00

[52] U.S. Cl. ......................................... 83/482; 83/488; 83/508

[58] Field of Search ................. 83/482, 508, 485, 487, 83/488, 489

[56] References Cited

U.S. PATENT DOCUMENTS

| | | | |
|---|---|---|---|
| 3,207,019 | 9/1965 | Vanzo et al. | 83/488 X |
| 3,686,991 | 8/1972 | Fujimoto | 83/482 |
| 3,726,169 | 4/1973 | Gazuit | 83/486 X |
| 3,762,259 | 10/1973 | Kuts | 83/488 X |
| 4,046,044 | 9/1977 | Paterson | 83/508 X |
| 4,152,962 | 5/1979 | Hendrischk | 83/482 |

FOREIGN PATENT DOCUMENTS

| | | | |
|---|---|---|---|
| 2040349 | 1/1971 | France . | |
| 2364760 | 4/1978 | France . | |
| 1315817 | 5/1973 | United Kingdom | 83/485 |
| 1416714 | 12/1975 | United Kingdom | 83/485 |

*Primary Examiner*—James M. Meister

[57] ABSTRACT

This cutting carriage for manufacturing pneumatic tires, comprises improvements allowing high-resistance steels to be cleanly cut at the smallest angles. The cutting carriage is characterized by a geometry allowing the ideal cutting conditions to be brought together for all types of fabric: large-diameter cutting disk, pivotable mobile assembly, optimum fixed clearance angle in all cases. The support mechanism during the cutting travel, and the disengagement mechanism during the return travel are provided by pneumatic members.

4 Claims, 3 Drawing Figures

Fig. 2
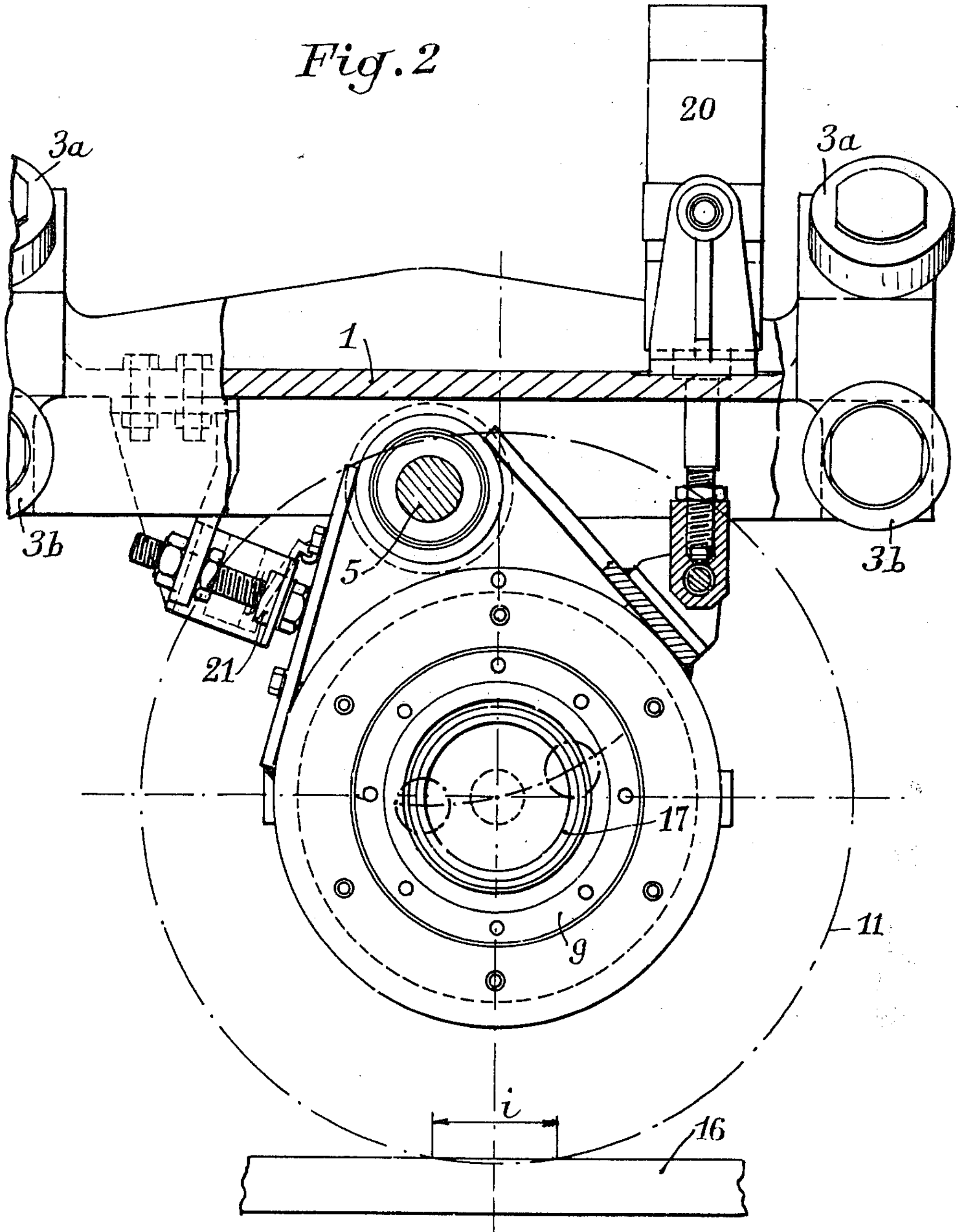
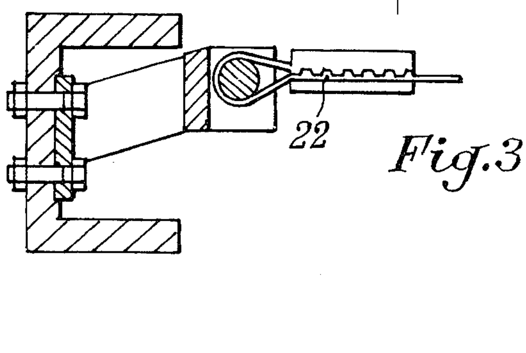
Fig. 3

METAL CUTTING MACHINES

BACKGROUND OF THE INVENTION

The present invention relates to disk shears and counterblade comprising a feed beam which unrolls a roll of fabric and at the end of which is pivotably mounted for varying the cutting angle, a cutting device itself comprising another cut in which travels a disk-holding carriage driven with a reciprocal movement along the counterblade.

There has already been proposed in U.S. Pat. No. 3,726,169 issued Apr. 10, 1973 a cutting carriage provided with a freely-rotating cutting disk which, during the cutting travel, is resiliently urged along its periphery adjacent the cutting edge against the downstream face of a cutting bar whose upper face supports upstream of the cutting line the strip of fabric to be cut, clamped by presses.

SUMMARY OF THE INVENTION

The aim sought in the improved cutter is to take into account the following factors in the development of the technique.

(1) Use of metal (steel) cabled fabrics has been extended to "heavy vehicles" supporting high specific loads. The thickness of the fabrics and the diameters of the cables are increased.

(2) For reasons of economy of material and a more favorable weight condition, the steels used are more and more resistant (ultimate stress up to 250 h.bars).

(3) For reasons of flexibility (minimum curvature radius) and comfort for the passengers, the metal fabrics of private cars are now formed from more resistant twisted cords, but finer and pressed closer against each other.

(4) The appearance of new synthetic fibers (ARAMID) and glass fibers which compete with steel, has activated the development of factor 3.

(5) With standardization in mind, there is a need to seek mechanical cutting parameters allowing the cutter to be used not only for cutting steel, but also the new fibers.

(6) The tire industry concerned with improving its productivity imposes on the equipment ever-increasing rates. The new cutting carriage moves three times faster than the old one.

(7) Since the new calandering equipment allows wider and wider calandered fabrics to be obtained, cutting beams of the cutting machines must be elongated while maintaining a strict geometry.

The cutting carriage is characterized by geometry allowing the ideal cutting conditions to be brought together for all types of fabric: large diameter cutting disk, pivotable moving assembly, optimal fixed clearance angle in all cases.

The support mechanism during the cutting travel, and the disengagement mechanism during the return travel are provided by pneumatic members.

These pneumatic members are characterized by the presence of two single-acting opposed coaxial pistons in the same chamber, by the short travel of said pistons, providing simultaneous release of the disk and of the reaction rollers during the return travel.

A pneumatic support system is provided so that a slight variation of parallelism between the counterblade and the guide rails for the carriage do not affect the cutting stress.

Finally the profile of the guide rail is designed so as to facilitate the vertical distance adjustment in relation to the upper face of the counterblade.

DESCRIPTION OF THE DRAWINGS

Other characteristics of this cutting machine will be clear from the following detailed description, with reference to the accompanying drawings in which:

FIG. 2 is a section along line II—II of FIG. 1, the guide rails being assumed to have been removed.

FIG. 3 is a view of a detail.

DESCRIPTION OF THE PREFERRED EMBODIMENT(S)

Figure 1:
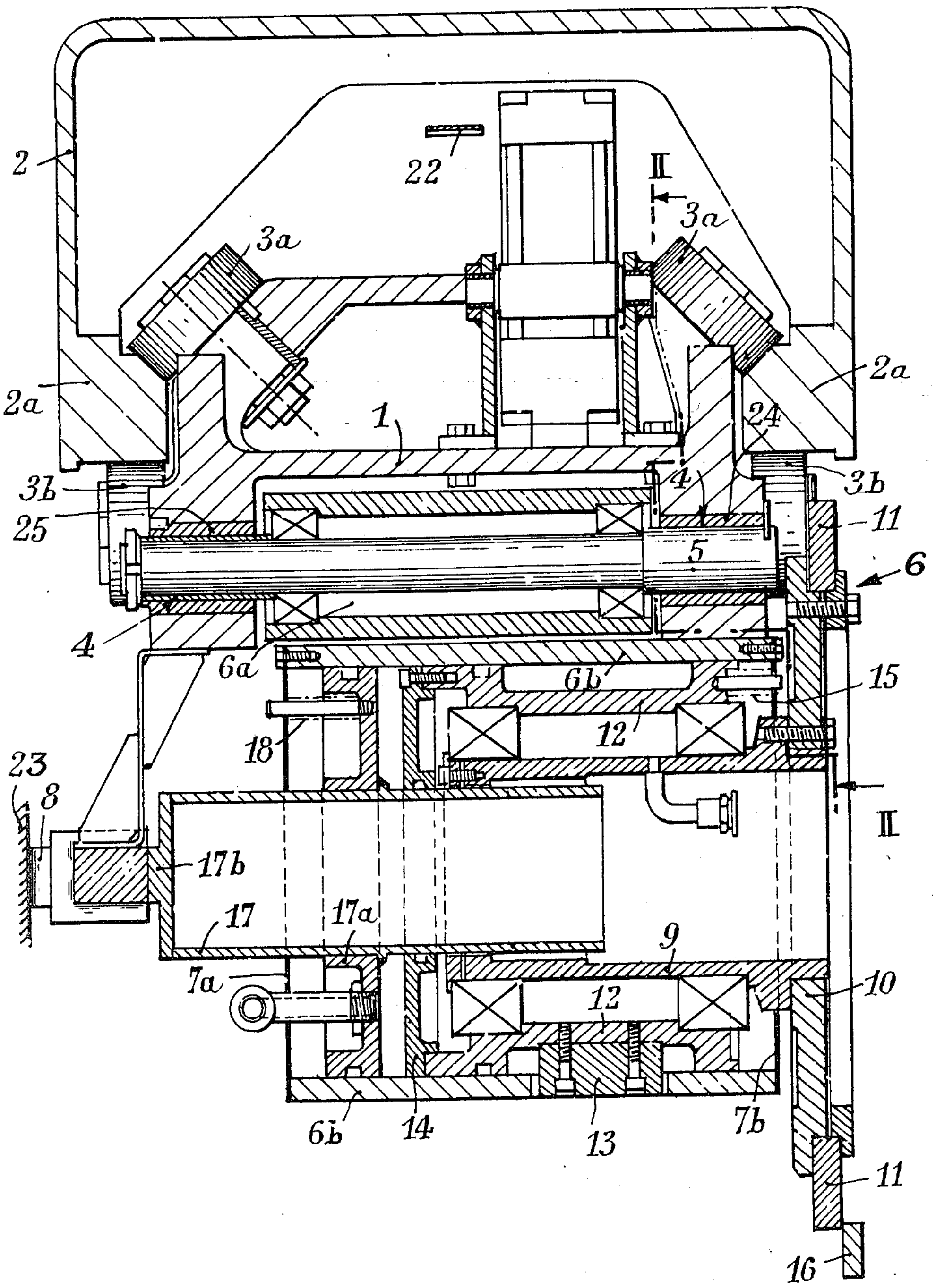
FIG. 1 is a section of the carriage taken in transverse to the beam.

Cutting carriage 1 travels in a beam 2. It is controlled in translation by a fixed DC motor (not shown). The transmission is provided by notched wheels and belts 22.

The carriage is fitted with four sloping-contact rollers **3*a* and four horizontal-contact rollers 3*b*, traveling over rails 2*a***, the assembly forming a prismatic guide for ensuring a rectilinear path for the carriage.

In particular, since the lower face of the rails is horizontal, the height setting in relation to the counterblade 16 is easy, and the interference i of knife 11 with the counterblade (an important factor in cutting quality) may be maintained constant. That allows very long beams to be constructed without difficulty (more than 6 m).

The cutting carriage comprises in its lower part two bores 4 which receive shaft 5 around which pivots, in sleeve **6*a*, the mobile cutting assembly 6. The two bores 4 are coaxial, and their axis 5** is not exactly perpendicular to the cutting line. A slight clearance is provided for constituting the chisel effect.

The geometry of the mobile assembly 6:

- diameter of the disk increased to 400 mm,
- pivoting radius, the height of the pivot in relation to the cutting edge, is designed so as to obtain an efficient chisel effect suitable for fabrics (including textile fibers). The mobile assembly 6 comprises essentially two sleeves **6*a*, 6*b* with parallel axes. One of the sleeves 6*a* receives the pivoting shaft 5, the other sleeve 6*b* carries the active part: knife holder 10** and pressure members.

The pressure members are formed by a single-acting pneumatic jack comprising a piston 12 sliding in sleeve **6*b*, a pressure plate 14 integral with piston 12, a key 13** ensuring axial guiding and limiting the return travel.

Piston 12 is a bushing in which bearings are housed. The bearings support a hollow shaft 9 and allow this latter to rotate freely. Hollow shaft 9 carries the knife-holder flange 10 on which is fixed the circular knife 11. The knife can be easily removed for resharpening.

Knife 11 is only applied against counterblade 16 during the cutting travel (outward travel). During the return, the knife is pushed back from the counterblade by reaction of return springs 15 on piston 12, the pneumatic pressure then being released.

In the same sleeve **6*b* of mobile assembly 6, there slides a second piston 17 coaxial and opposed to piston 12. Piston 17 forms a mobile jack bottom. It is provided with a pressure plate 17*a* returned by springs 18. Piston 17 carries at its outer part a bearing washer 17*b* which transmits the cutting reaction to the reaction rollers 8 which travel on a vertical rail 23** integral with the cutting beam. The reaction bearing is then in the axis of the cutting disk, which confers a great stability on the assembly.

The mobile bottom 17, returned by springs 18 during the return travel, allows the mobile assembly to move with respect to the reaction rollers 8. Since the support of these rollers is resilient, the contact on the rail ceases during the return, thus lengthening the life of these rollers.

Sleeve *6b* is closed, at each end, by thin plates *7a* and *7b* respectively, which serve as a support for the respective return springs of both pistons. The force of these springs is low, they have only to overcome internal friction.

The raising of the mobile assembly is effected by means of a pneumatic jack 20. The raising is controlled, at the same time as the backward movement of the disk, before the carriage starts its return travel. To avoid the edge from being damaged by overlapping, the pneumatic circuits are designed so that the backward movement of the disk takes place 0.1 seconds before the raising, and so that the pressure is only applied when the mobile assembly is lowered against stop 21.

This stop 21 is adjustable, which allows the value of the disk counterblade interference i to be set accurately, and this value to be reset after sharpening.

The action of the jacks is controlled with great accuracy by electromagnetic valves carried on the cutting carriage and allowing instantaneous reactions. The pneumatic supply is provided by helical hose.

The release is controlled by a proximity detector installed on the cutting beam.

The force is provided by pneumatic pressure. Thus, the adjustment is very convenient (manometric valve) and the force, once adjusted, is not affected by a defect of straightness or of parallelism of the counterblade in relation to the travel path.

The use of light alloys for constructing the carriage, the replacement of traction chains by notched belts, reduces by more than a half the inertial masses, thus providing increased rigidity.

Thus, the highest speed of the cutting carriage may exceed 4 m per second, allowing clean cuts of high-resistance steels to be effected at the smallest angles.

It is apparent that within the scope of the invention, modifications and different arrangements can be made other than those here disclosed. The present disclosure is merely illustrative with the invention comprehending all variations thereof.

I claim:

1. In a cutting machine having a cutter bar supporting a strip to be cut, a cutting carriage comprising:

- a mobile cutting assembly freely rotatable in a cylinder;
- contact rollers at said carriage for travelling over two prismatic rails for prismatic guiding of said carriage;
- two coaxial bores provided in part of said carriage;
- a shaft for pivotally supporting said mobile assembly in said bores;
- pressure members for resiliently urging said assembly, during cutting travel, towards the cutter bar;
- said pressure members constituting a pneumatic jack embodying said cylinder, a sleeve shaped piston, a hollow shaft rotatable in said piston and a circular flange carried by said shaft and arranged to hold a cutting knife;
- a second piston slidable in said cylinder in coaxial relationship with and operatively opposed to said sleeve shaped piston;
- a pressure plate fixed to said second piston;
- return springs for spacing said piston and thereby spacing said knife from the cutter bar during return travel of the cutting carriage; and
- means for transmitting cutting reaction to rollers travelling over a rail parallel to the cutter bar.

2. The cutting carriage as claimed in claim 1, comprising plates closing the ends of said cylinder, and supporting said return springs for said two pistons.

3. The cutting carriage as claimed in claim 2, comprising a pneumatic jack for raising the mobile assembly relative to said cutter bar, and adjustable stops limiting the lowering of the mobile assembly to the level of the cutting knife-cutting bar interference.

4. In a cutting machine having a cutter bar supporting a strip to be cut, a cutting carriage comprising:

- a mobile cutting assembly freely rotatable in a cylinder;
- contact rollers at said carriage for travelling over two prismatic rails for prismatic guiding of said carriage;
- two coaxial bores provided in part of said carriage;
- a shaft for pivotally supporting said mobile assembly in said bores;
- a reaction surface parallel to the cutting bar;
- pressure members for resiliently urging said assembly, during cutting travel, towards the cutting bar;
- said pressure members constituting a pneumatic jack embodying said cylinder with a pair of opposed pistons therein;
- a shaft rotatable in one of said pistons and having mounted thereon a circular flange with a knife;
- reaction means connected to the other of said pistons;
- fluid means engaging said pressure members for moving said one of said pistons and said cutting knife into engagement with said bar and the other of said pistons and reaction mean into engagement with said reaction surface;
- spring means carried by each of said pistons for returning said pistons to their initial positions.

* * * * *